(12) United States Patent
Chiang

(10) Patent No.: US 7,331,428 B2
(45) Date of Patent: Feb. 19, 2008

(54) WHEEL ASSEMBLY OF LUGGAGE

(75) Inventor: Hsi-Wu Chiang, Taichung (TW)

(73) Assignee: C & C Luggage Manufacturing Co., Ltd. (TW)

( * ) Notice: Subject to any disclaimer, the term of this patent is extended or adjusted under 35 U.S.C. 154(b) by 0 days.

(21) Appl. No.: 11/438,286

(22) Filed: May 23, 2006

(65) Prior Publication Data

US 2007/0215414 A1   Sep. 20, 2007

(30) Foreign Application Priority Data

Mar. 15, 2006   (TW) ............................... 95204289 U

(51) Int. Cl.
*B60B 33/00* (2006.01)
(52) U.S. Cl. .................................... 188/1.12
(58) Field of Classification Search ................ 188/1.12
See application file for complete search history.

(56) References Cited

U.S. PATENT DOCUMENTS

| | | | | |
|---|---|---|---|---|
| 1,671,774 A * | 5/1928 | McIntosh | ................ | 16/35 R |
| 4,414,702 A * | 11/1983 | Neumann | ................ | 16/35 R |
| 4,664,231 A * | 5/1987 | James | ................ | 188/1.12 |
| 4,669,580 A * | 6/1987 | Neville | ................ | 188/1.12 |
| 4,677,706 A * | 7/1987 | Screen | ................ | 16/35 R |
| 4,722,114 A * | 2/1988 | Neumann | ................ | 16/35 R |
| 4,815,161 A * | 3/1989 | Timmer et al. | ................ | 16/35 R |
| 5,083,341 A * | 1/1992 | Milbredt et al. | ................ | 16/35 R |
| 5,133,106 A * | 7/1992 | Milbredt et al. | ................ | 16/35 R |
| 5,244,062 A * | 9/1993 | Felton | ................ | 188/1.12 |
| 5,774,936 A * | 7/1998 | Vetter | ................ | 16/35 R |
| 5,839,546 A * | 11/1998 | Yan | ................ | 188/69 |
| 6,360,851 B1 * | 3/2002 | Yang | ................ | 188/1.12 |
| 6,532,624 B1 * | 3/2003 | Yang | ................ | 16/35 R |
| 6,584,641 B1 * | 7/2003 | Milbredt | ................ | 16/35 R |
| 6,619,438 B1 * | 9/2003 | Yang | ................ | 188/1.12 |
| 6,865,775 B2 * | 3/2005 | Ganance | ................ | 16/35 R |

* cited by examiner

*Primary Examiner*—Devon Kramer
(74) *Attorney, Agent, or Firm*—Browdy and Neimark, PLLC

(57) ABSTRACT

A wheel assembly for a luggage includes switch member provided on a base of the wheel assembly at a fixed location. The switch member is connected to a driven shaft, and the driven shaft is connected to a brake member. The brake member has a stop portion associated with a wheel. When the switch member is moved, the brake member is moved proximal to or distal to the wheel via the driven shaft so as to brake or release the wheel.

12 Claims, 11 Drawing Sheets

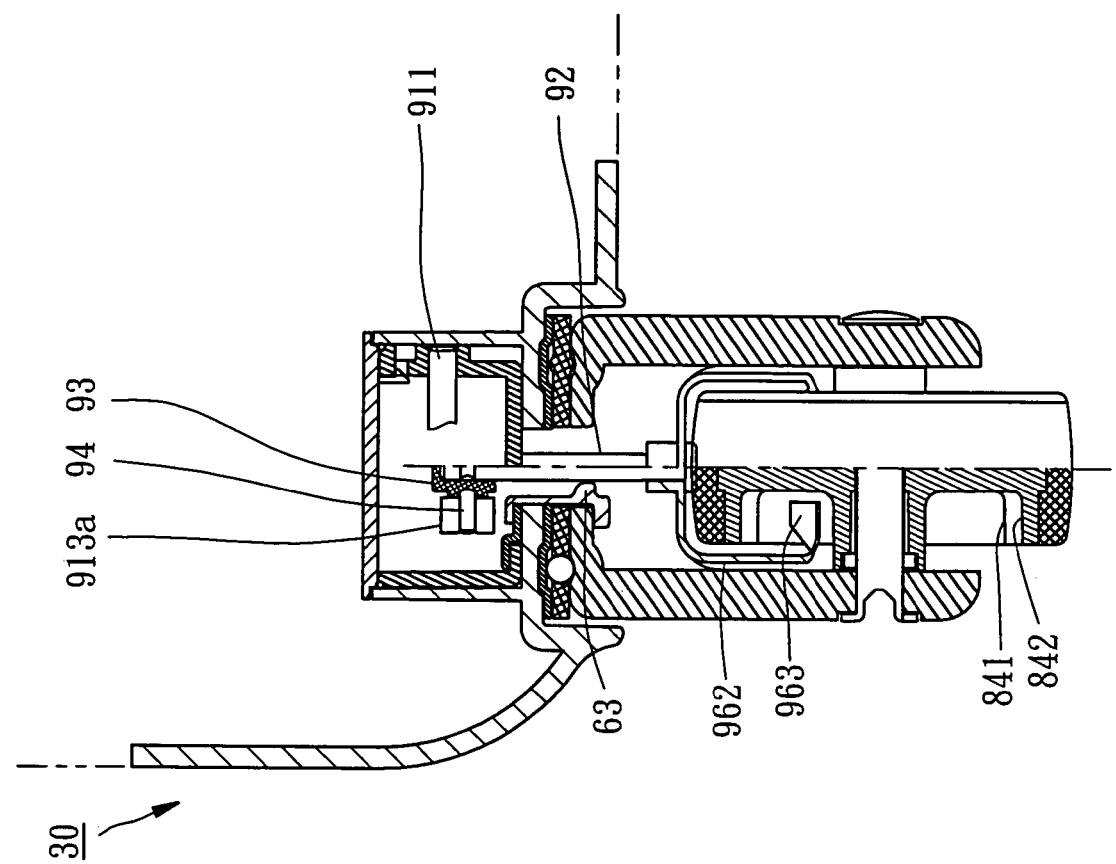
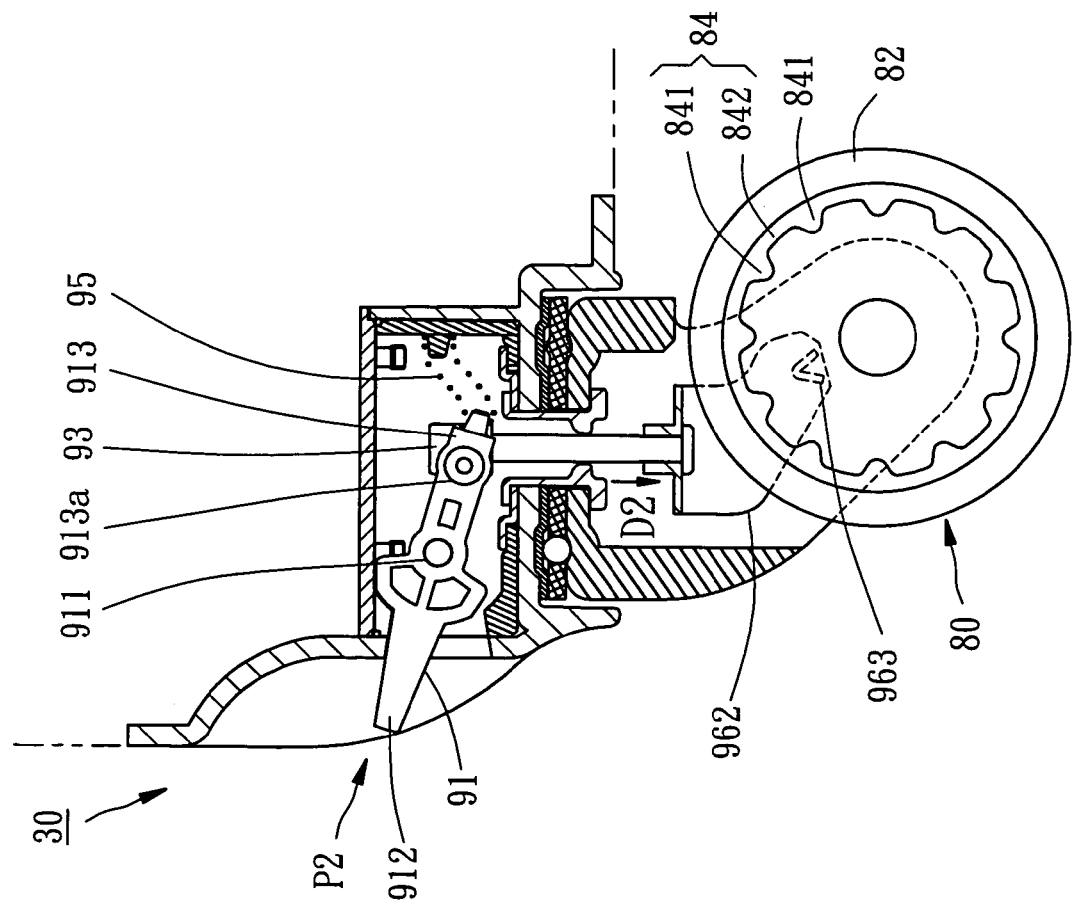
FIG. 7
FIG. 6

WHEEL ASSEMBLY OF LUGGAGE

BACKGROUND OF THE INVENTION

1. Field of the Invention

The present invention relates generally to a wheeled luggage, and more particularly to a wheel assembly of the luggage.

2. Description of the Related Art

FIG. 1 shows a conventional wheel assembly 1 of a wheeled luggage, which includes a base 11, a frame 12, a wheel 13, a plate 14 and a lever 15. The base 11 is fixed on a bottom of a case 10 the wheeled luggage with the frame 12 pivoted thereon. The wheel 13 is pivoted on the frame 12. The plate 14 has an end fixed to the frame 12 and the other end suspended, wherein the suspended end of the plate 14 is defined as a contacting end 141. The lever 15 has an end pivoted on the frame 12 and the other end suspended, wherein the suspended end of the lever 15 is defined as a pressing end 151. Pressing the pressing end 151 of the lever 15 will move the plate 14 downwards to contact the contacting end 141 thereof with the wheel 13 for braking.

The contacting end 141 of the plate 14 only has little area contacting the wheel 13, and only is designed for braking the wheel 13 when it rotates clockwise. The plate 14 only has weak power to brake or is ejected from the wheel 13 when the wheel 13 rotates counterclockwise. Therefore, the conventional brake still has many problems in braking.

In addition, because the frame 12 is free rotation, and the lever 15 moves along with it, user usually needs time to find the pressing end 151 of the lever 15 when he/she wants to brake the wheel 13.

SUMMARY OF THE INVENTION

The primary objective of the present invention is to provide a wheel assembly for luggage, which has good brake capacity and is easy to operate.

The secondary objective of the present invention is to provide luggage, which is provided with a switch to operate the stop device exerted on the wheels.

The third objective of the present invention is to provide luggage, which is provided with a switch which facilitates user operation of the brake apparatus.

According to the objectives of the present invention, a wheel assembly for a luggage comprises a base, which is fixed to the luggage, having an upper bore, a frame, which is pivoted on the base, having a lower bore, and a wheel, which is pivoted on the frame, having a running portion and at least a stop portion. A brake device includes a switch member, a driven shaft and a brake member. The switch member, which has an activating end exposed out of the base and a driving end, is pivoted on the base to be moved between a first position and a second position. The driven shaft is received in the upper bore of the base and the lower bore of the frame. The driven shaft has a top end pivotally connected to the driving end of the switch member. The brake member, which has a stop portion, is connected to a bottom end of the driven shaft. When the switch member is moved to the first position by a user, the driven shaft is moved along a first direction so as to move the stop block of the brake member into engagement with the stop portion of the wheel where it is held in engagement by a spring. When the switch member is moved to the second position by the user, the driven shaft is moved along a second direction so as to move the stop portion of the brake member out of engagement with the stop portion of the wheel where it is held out of engagement by the spring.

BRIEF DESCRIPTION OF THE DRAWINGS

FIG. 6 is similar to FIG. 3, showing the switch device at the second position;

FIG. 7 is similar to FIG. 5, showing the switch device at the second position;

DETAILED DESCRIPTION OF THE INVENTION

Figure 1:
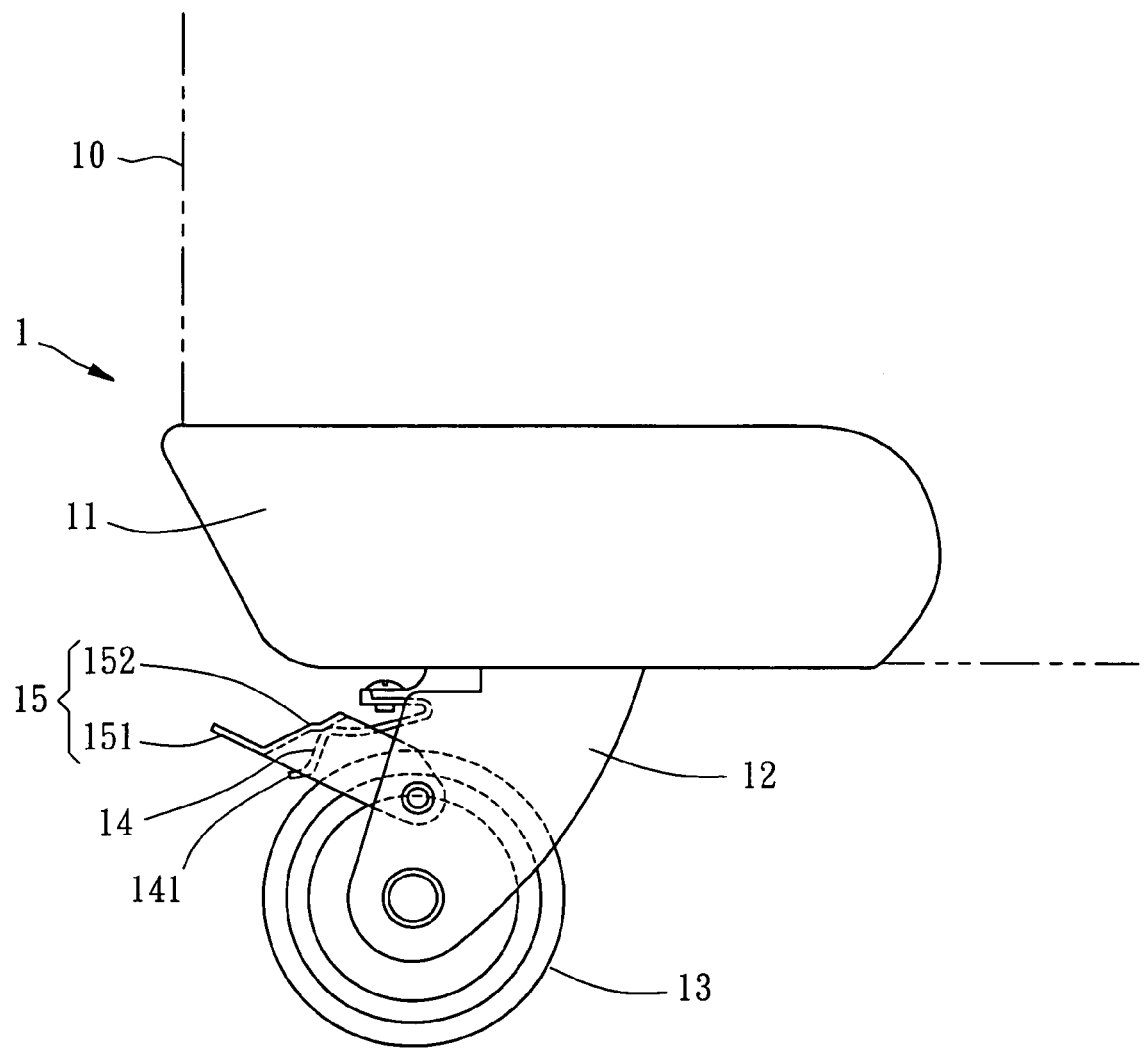
FIG. 1 is a front view of the conventional wheel assembly.
Figure 2:
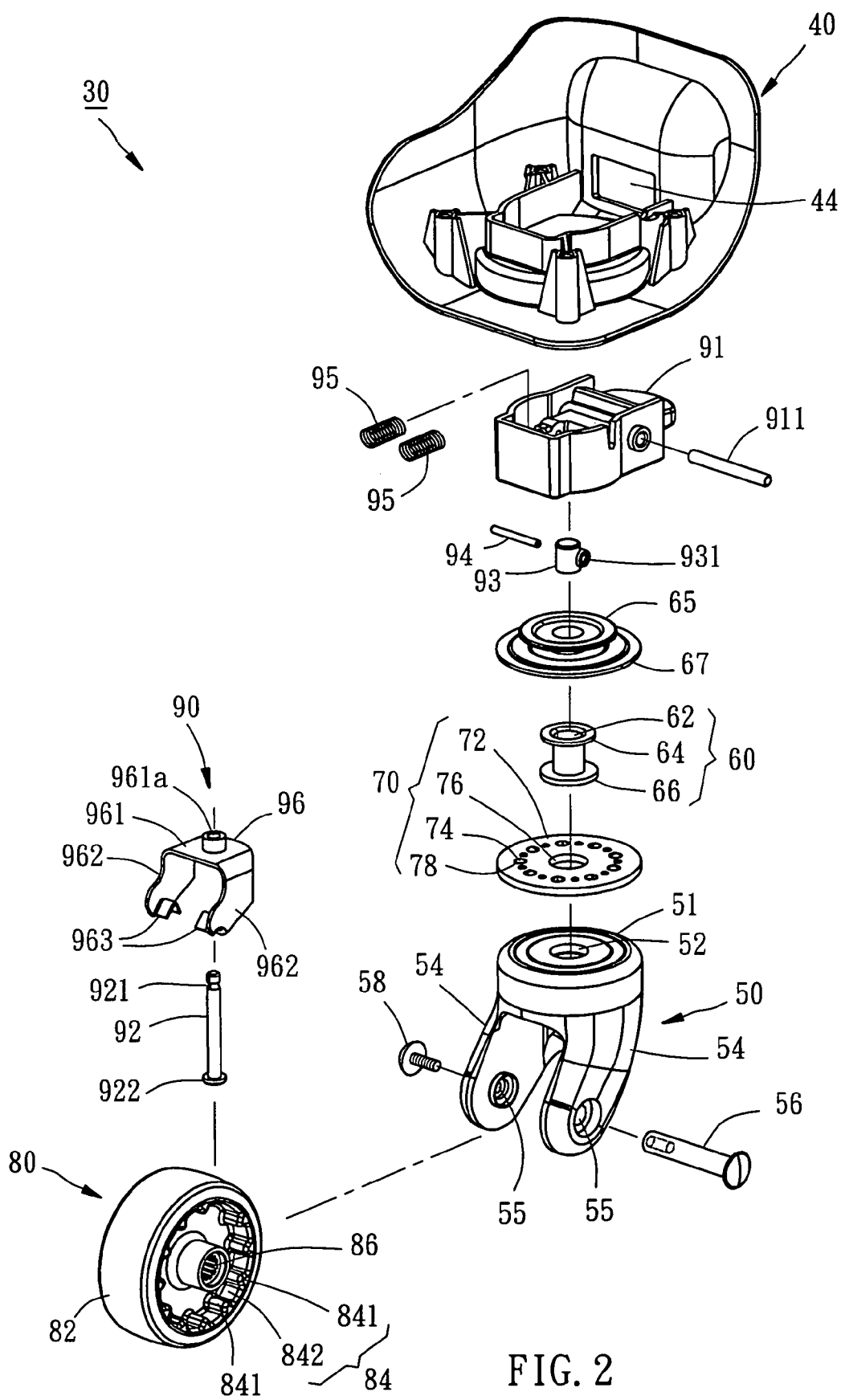
FIG. 2 is an exploded view of a first preferred embodiment of the present invention.

As shown in FIG. 2 to FIG. 7, a wheel assembly 30 of a luggage 100 of the first preferred embodiment of the present invention comprises a base 40, a frame 50, a hub 60, a bearing 70, a wheel 80 and a brake device 90.

The base 40 is fixed on a bottom of the luggage 100 with an upper bore 42 and a lateral opening 44.

The frame 50 has a top plate 51, two pivot portions 54, a shaft 56 and a screw 58. The top plate 51 has a lower bore 52. The pivot portions 54 are connected to opposite sides of the top plate 51, each of which has a through hole 55.

Figure 3:
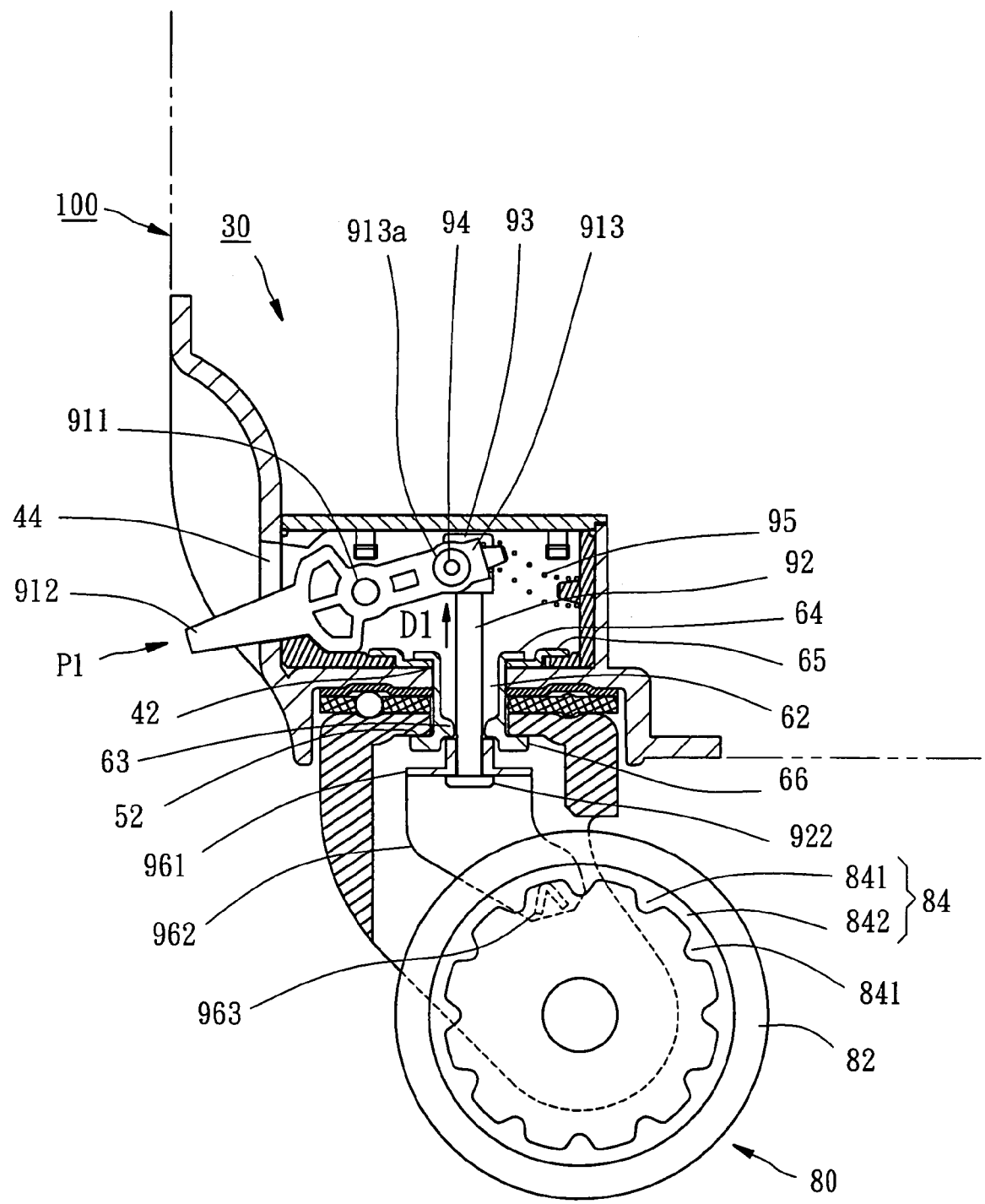
FIG. 3 is sectional view of in parts of the first preferred embodiment of the present invention, showing the switch device at the first position.

The hub 60, which has an axle hole 62, is inserted into the upper bore 42 of the base 40 and the lower bore 52 of the frame 50. The hub 60 has an upper stop protrusion 64 at a top thereof, as shown in FIG. 3 contacted with an upper pad 65 in the base 40, and a lower stop protrusion 66 contacted with an interior side of the frame 50, therefore the frame 50 is pivoted on the base 40 for rotation. The hub 60 has an interior protrusion 63 on a sidewall of the axle hole 62.

The bearing 70 has a ring plate 72 and balls 74. The ring plate 72 is provided between the base 40 and the frame 50, which has a center hole 76 and bores 78 around the center hole 76, and the balls 74 are received in the bores 78 of the ring plate 72 respectively. The balls 74 are contacted with a lower pad 67 and the frame 50 respectively.

The wheel 80 has a running portion 82, two stop portions 84 and a through hole 86. The running portion 82 has a diameter greater than that of the stop portions 84. The stop portions are provided on opposite sides of the running portion 82 with a plurality of outer protrusions 841 and recesses 842 beside the outer protrusions 841 respectively arranged in a circular pattern. The shaft 56 of the frame 50 is inserted into the through holes 55 of the pivot portions 54 and the through hole 86 of the wheel 80, and then the screw 58 is screwed thereto to pivot the wheel 80 on the frame 50.

The brake device 90 includes a switch member 91, a driven shaft 92, a lid 93, an axle shaft 94, two springs 95 and a brake member 96.

Figure 4:
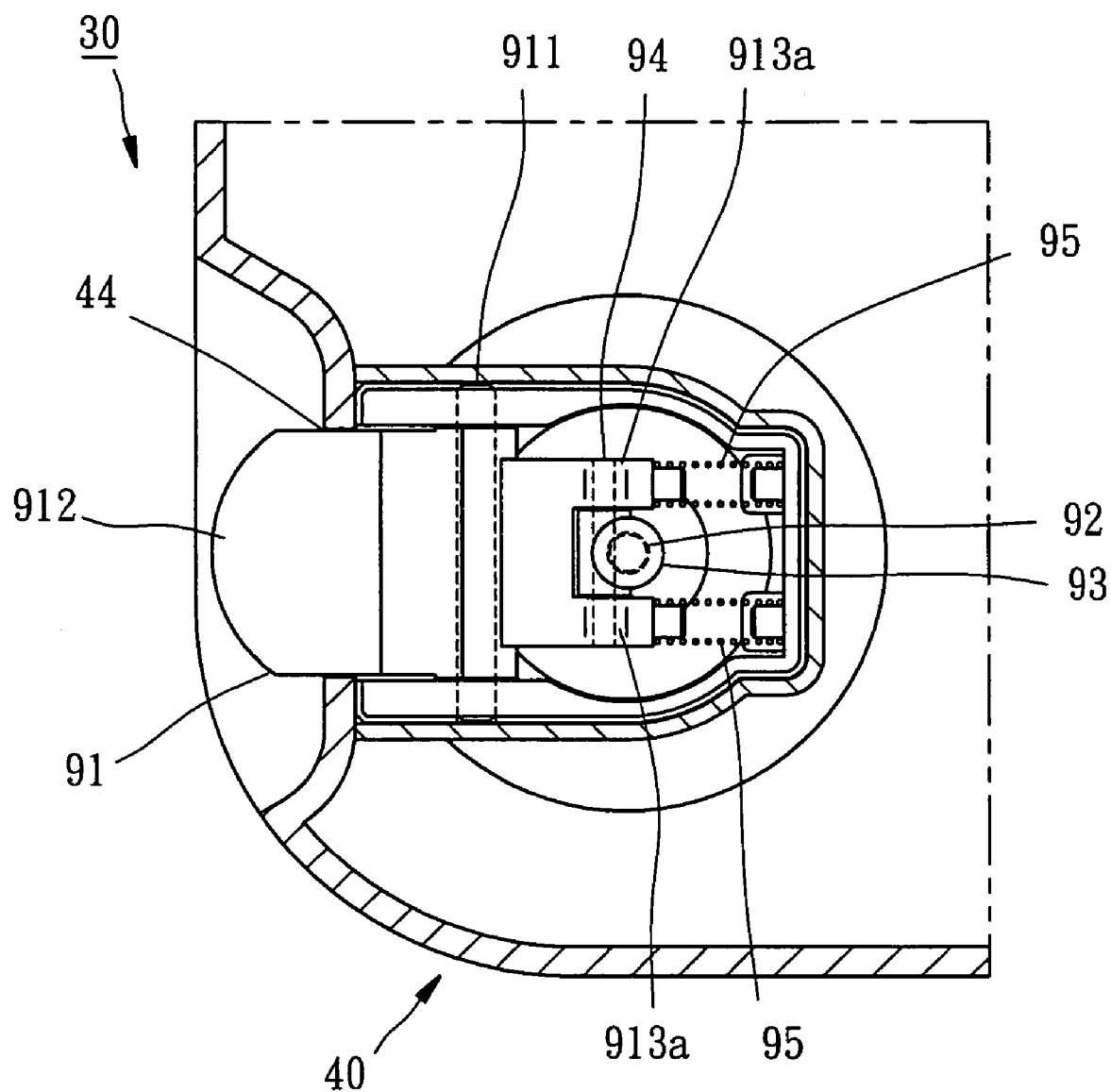
FIG. 4 is a top view of FIG. 3.

The switch member 91 is a plate with a shaft 911 pivoted on the base 40 to be moved between a first position P1 (FIG. 3) and a second position P2 (FIG. 6). The switch member 91 has an activating end 912 and a driving end 913 at opposite ends, wherein the activating end 912 extends out of the base 40 via the lateral opening 44 of the base, and the driving end 913 consists of two protrusions 913a, as shown in FIG. 4.

The driven shaft 92 has an annular slot 921 adjacent to a top end thereof and an annular block 922 at a bottom end thereof.

The lid 93 is fixed to the top end of the driven shaft 92 between the protrusions 913a of switch member 91. The lid 93 further has a transverse through hole 931.

The axle shaft 94 is inserted into the through hole 931 of the lid 93 and received in the annular slot 921 of the driven shaft 92 to permit a top end of the axle shaft 921 to pivot the switch member 91 in base 40.

Accordingly, springs 95 have opposite ends compressed and abuttingly engaged between the protrusions 913a and the interior side of the base 40. When a user moves the switch member 91 to the first position P1, springs 95 hold the switch member in that position as shown in FIG. 3 and when the user moves switch member 91 to the second position P2, springs 95 also hold the switch member in that position as shown in FIG. 6.

Figure 8:
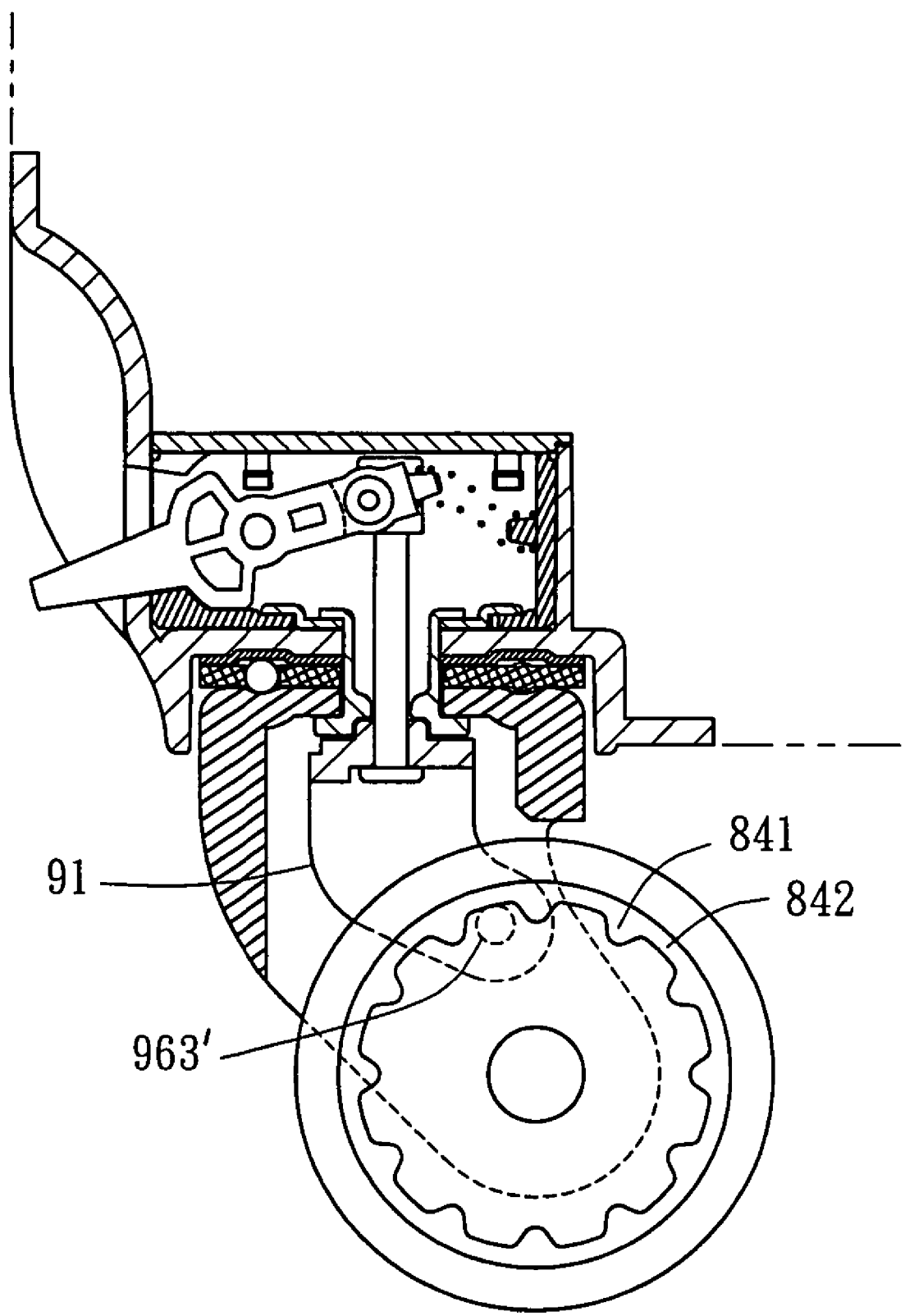
FIG. 8 is similar to FIG. 3, showing the column-like stop block.

The brake member 96 has a top plate 961 and two lateral plates 962 projected downwards from opposite ends of the top plate 961. The top plate 961 has a bore 961a with a diameter less than that of the annular block 922 to stop the annular block 922 of the driven shaft 92 against an interior side of the top plate 961 when switch 91 is moved to the second position P2. The lateral plates 962 are located at outer sides of the stop portions 84, each of which has a stop block 963 for engagement with the stop portion 84. The stop blocks 963 are triangular cones in the present invention. It is noted that the stop blocks may have various aspects, such as a stop block 963' shown in FIG. 8 is a column.

Figure 5:
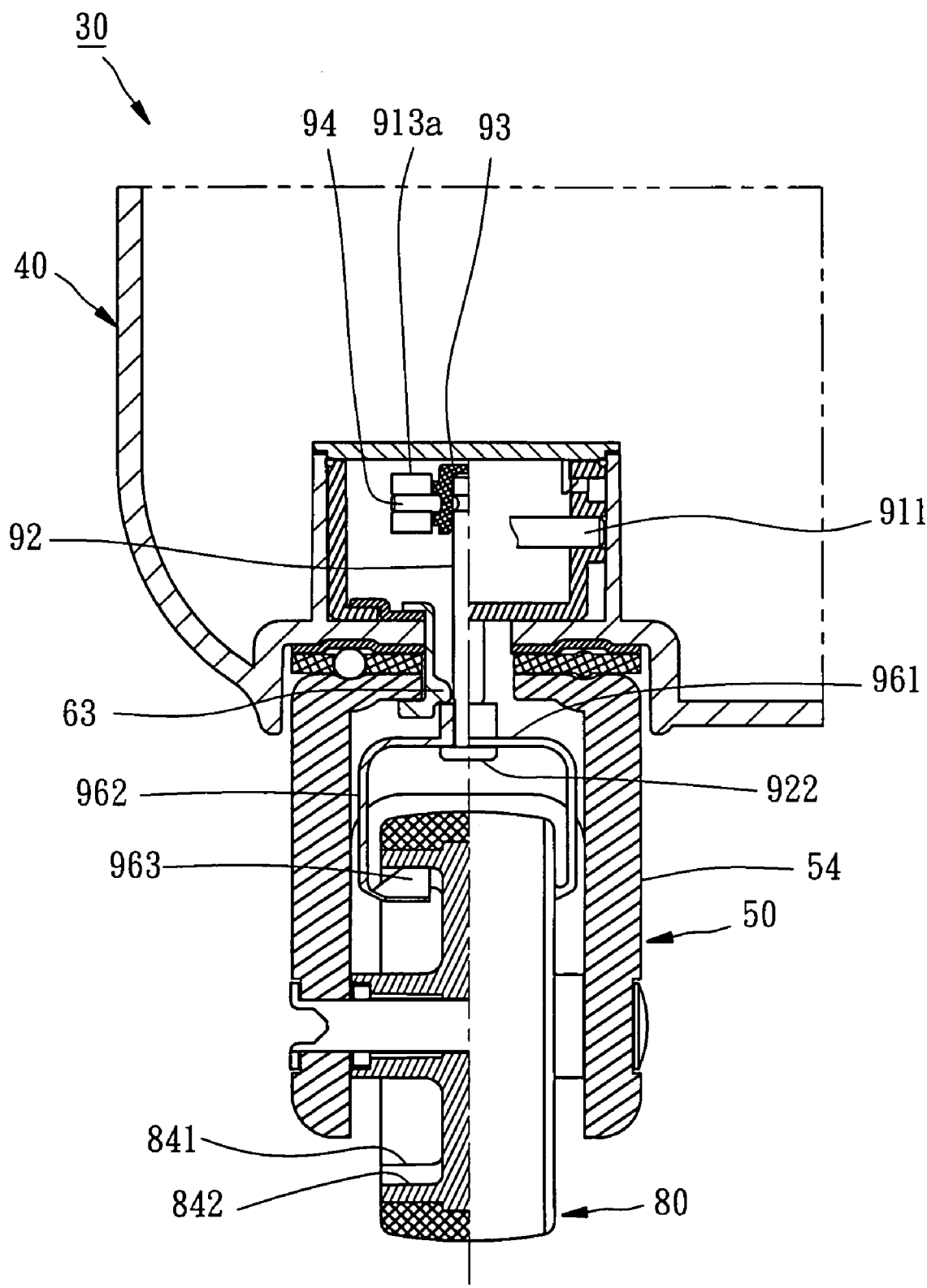
FIG. 5 is sectional view of in parts of the first preferred embodiment of the present invention, showing the switch device at the first position.

As shown in FIG. 3 and FIG. 5, when the activating end 912 of the switch member 91 is moved downwards to the first position P1, the driven shaft 92 and the brake member 96 are moved upwards along a first direction D1. When the top plate 961 touches the interior protrusion 63 of the hub 60, the stop block 963 of the brake member 96 is received in one of the recesses 842 of the wheel 80, such that the neighboring outer protrusions 841 will stop the stop block 963 to stop the wheel 80.

To release the brake, the activating end 912 of the switch member 91 is moved upwards, as shown in FIG. 6, to the second position P2 by the user, the driven shaft 92 and the brake member 96 are moved downwards along a second direction D2, such that the stop block 963 of the brake member 96 is moved away from the recess 842 of the wheel 80 to permit the wheel 80 to freely rotate.

In conclusion, the brake device 90 of the wheel assembly 30 of the present invention may brake the wheel 80 both in clockwise and counterclockwise rotation. Furthermore, the switch member 91 of the brake device 90 has a fixed position to be operated easily.

Figure 9:
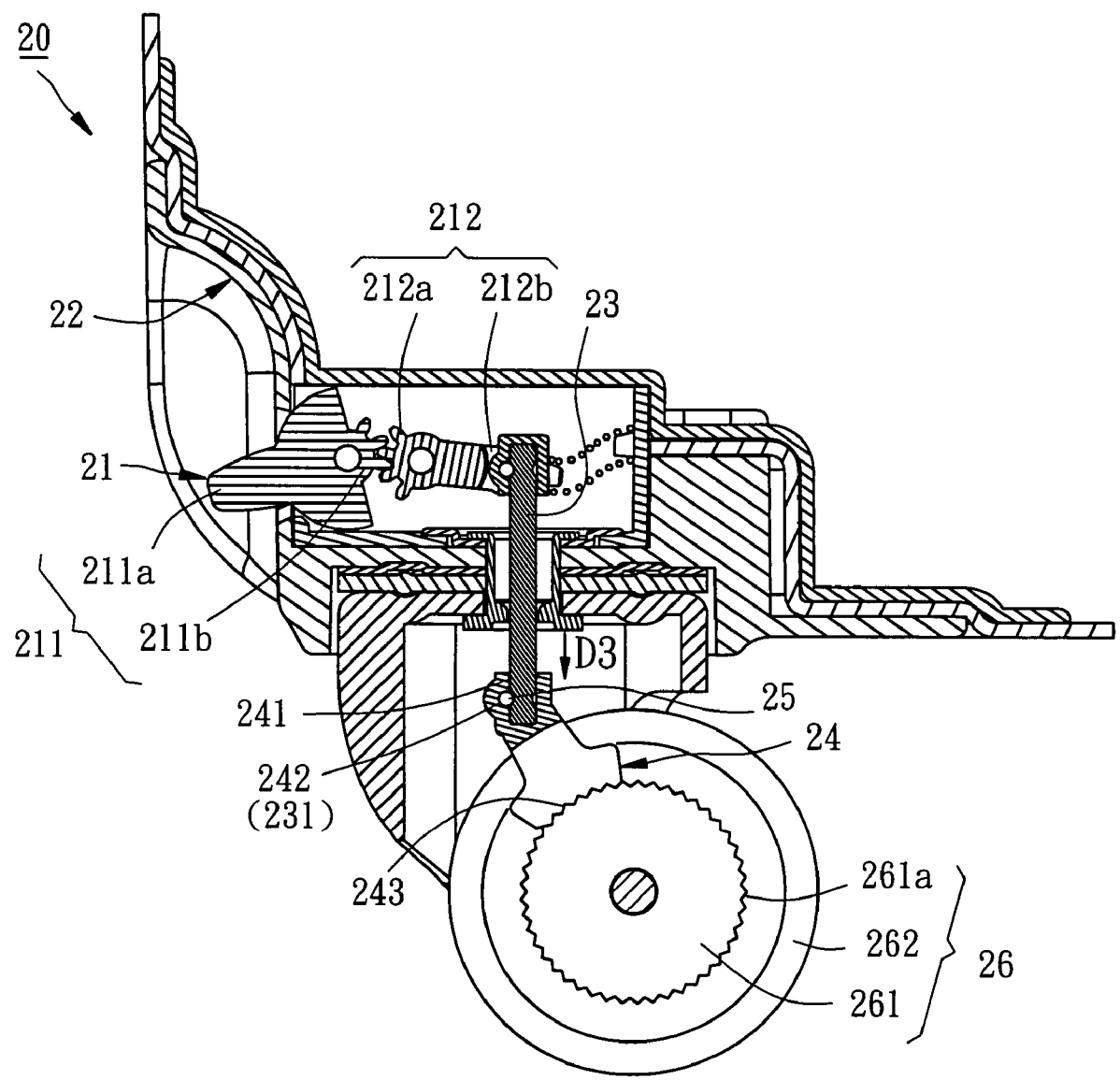
FIG. 9 is a sectional view of a second preferred embodiment of the present invention, showing the wheels being braked by the brake device.
Figure 10:
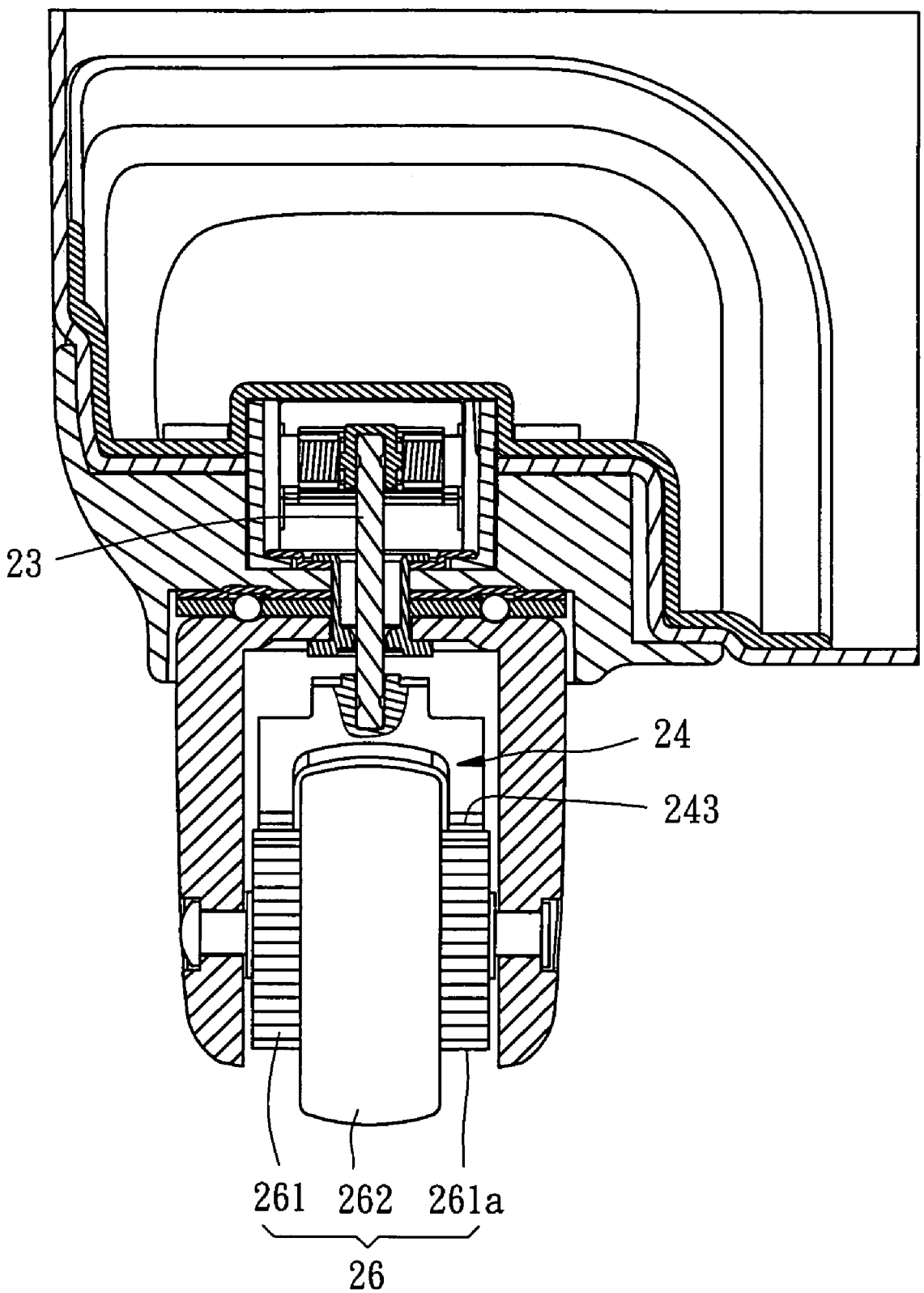
FIG. 10 is a sectional view of the second preferred embodiment of the present invention.
Figure 11:
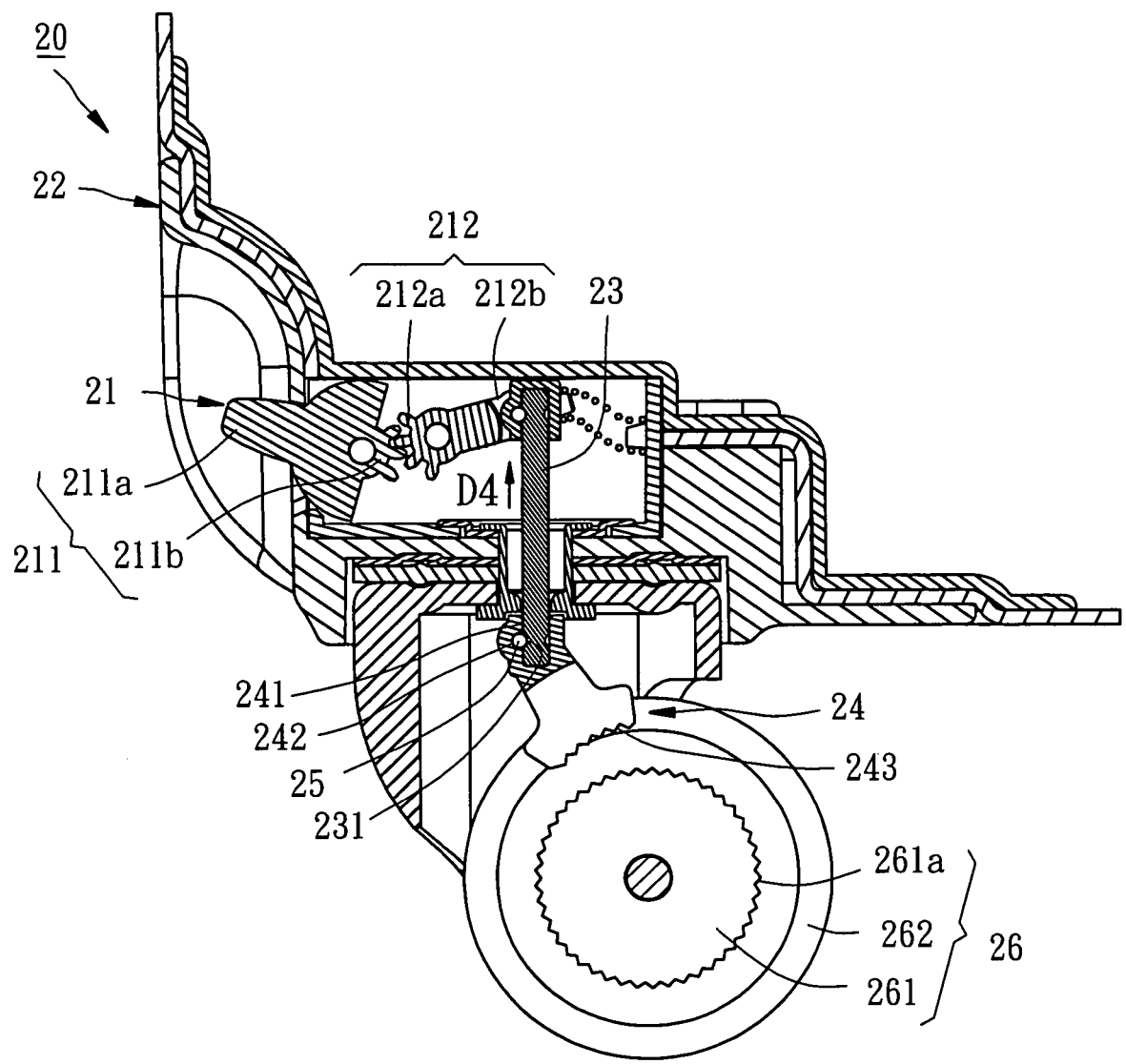
FIG. 11 is similar to FIG. 9, showing the wheels being braked by the brake device.
Figure 12:
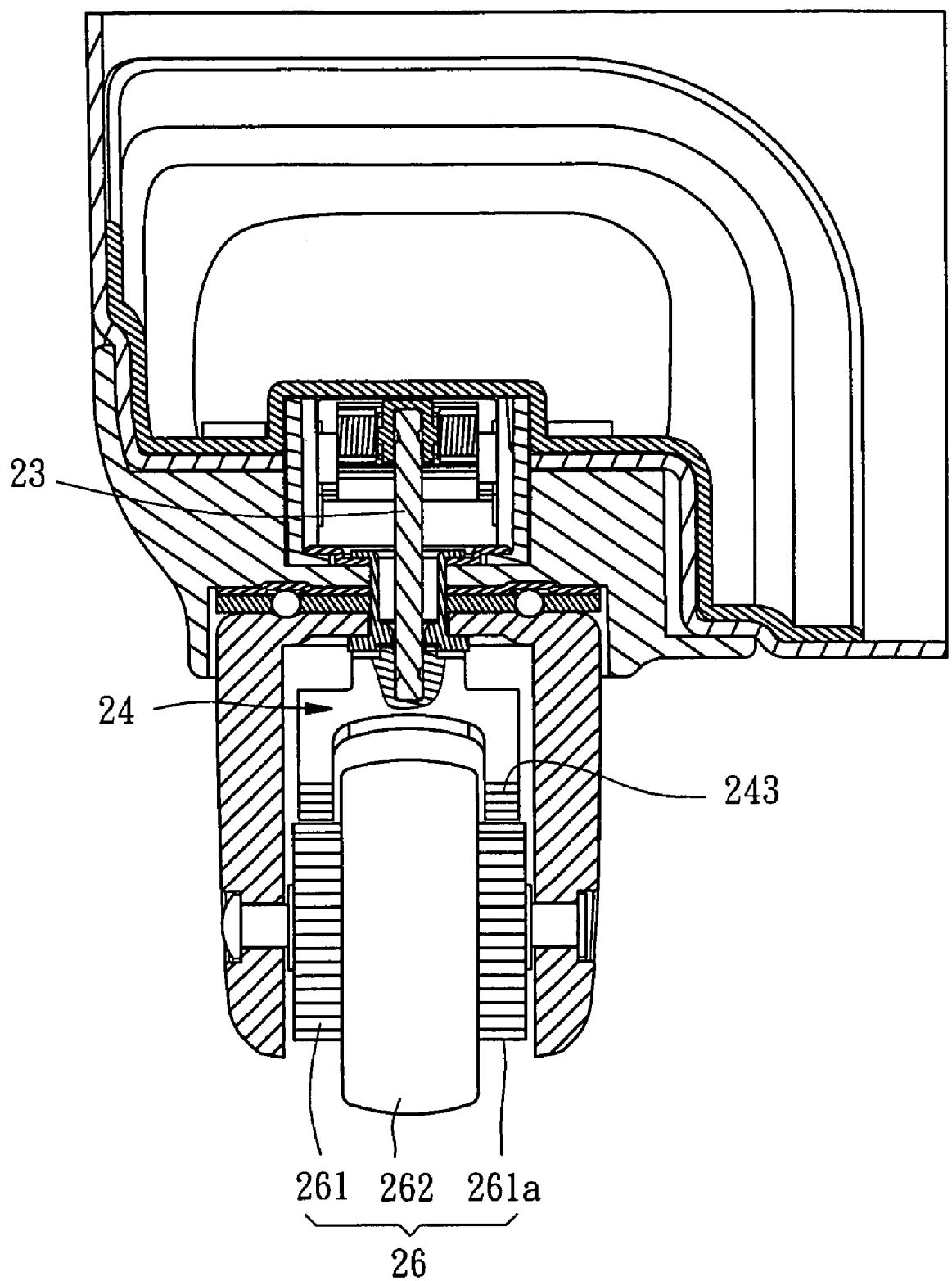
FIG. 12 is similar to FIG. 10, showing the wheels being braked by the brake device.

FIG. 9 and FIG. 10 show a wheel assembly 20 of the second preferred embodiment of the present invention, and the differences of the second preferred embodiment are described hereunder:

A switch member 21 of the wheel assembly 20 has a first plate 211 and a second plate 212 pivoted on a base 22. The first plate 211 has an activating end 211a and a first teeth portion 211b at opposite ends thereof. The second plate 212 has a second teeth portion 212a meshed with the first teeth portion 211b and a driving end 212b at opposite ends thereof. The driving end 212b has the same structure of the driving end 913 of the first preferred embodiment, and how the driven shaft 23 pivoted on the driving end 212b is the same also. The driven shaft 23 has a lateral slot 231. A brake member 24 has a first bore 241 and a second bore 242 communicated with each other. The driven shaft 23 has a bottom end inserted into the first bore 241, and a pin 25 is inserted into the second bore 242 and the lateral slot 231 to pivot the driven shaft 23 on the brake member 24. The brake member 24 further includes two teeth portions 243. A wheel 26 has a running portion 262 and two stop portions 261 projected from opposite sides of the running portion 262. Each of the stop portions 261 has a circular outer teeth portion 261a. As shown in FIG. 9 and FIG. 10, when the first plate 211 is moved downwards, the second plate 212 is moved to drive the driven shaft 23 downwards along a first direction D3 and to mesh the teeth portion 243 of the brake member 24 with the outer teeth portion 261a of the wheel 26 so as to brake the wheel 26. On the contrary, when the first plate 211 is moved upwards, the second plate 212 is moved to drive the driven shaft 23 moving upwards along a second direction D4 and to move the teeth portion 243 away from the wheel 26 so as to release the wheel 26 for free rotation. The functions are as same as above embodiment, so I don't describe it again.

The description above is a few preferred embodiments of the present invention and the equivalence of the present invention is still in the scope of the claim of the present invention.

What is claimed is:

1. A wheel assembly for luggage comprising:
   a base, which is fixed to a bottom side of the luggage, having an upper bore;
   a frame, rotatably engaged on the base, having a lower bore;
   a wheel, which is pivoted on the frame, having a running portion and at least one stop portion, wherein the running portion has a diameter greater than that of the stop portion; and
   a brake device including a switch member,
   a driven shaft and a brake member,
   wherein the switch member has an activating end exposed out through a slot in the base, a central portion pivoted in an interior of the base and a driving end pivoted to the shaft,
   wherein at least one spring is compressed between the driving end of the switch and the base into respective abutting engagement therewith,
   wherein a user can move the switch between a first switch position and a second switch position,
   wherein the driven shaft is received in the upper bore of the base and the lower bore of the frame with a top member,
   wherein the brake member has a stop portion connected to a bottom end of the driven shaft;
   wherein when the switch member is moved to the first switch position by the user, the driven shaft is moved along a first shaft direction so as to move the stop portion of the brake member into engagement with the stop portion of the wheel and held there by the spring, and when the switch member is moved to the second switch position by the user, the driven shaft is moved along a second shaft direction so as to move the stop portion of the brake member out of engagement with the stop portion of the wheel and held there by the spring.

2. The wheel assembly as defined in claim 1, wherein the switch member includes a first plate and a second plate, both of which are pivoted on the base, and the first plate has the activating end at an end thereof and a first teeth portion at an opposite end thereof, and the second plate has a second teeth portion at an end thereof to be meshed with the first teeth portion of the base and the driving end at an opposite end thereof.

3. The wheel assembly as defined in claim 1, wherein, The driven shaft has an annular slot adjacent to the top member, and the driving end of the switch member has two parallel protrusions, and the brake device includes a lid and a shaft, wherein the lid is connected to the top member of the driven shaft between the protrusions, and the shaft is inserted into a through hole of the lid and received in the annular slot of the driven shaft.

4. The wheel assembly as defined in claim 2, wherein, The driven shaft has an annular slot adjacent to the top member, and the driving end of the switch member has two parallel protrusions, and the brake device includes a lid and a shaft, wherein the lid is connected to the top end of the driven shaft between the protrusions and the shaft is inserted into a through hole of the lid and received in the annular slot of the driven shaft.

5. The wheel assembly as defined in claim 3, wherein the at least one springs has opposite ends respectively abuttingly engaged to the two protrusions of the switch member and an interior side of the base so as to locate the switch member at the first switch position or at the second switch position.

6. The wheel assembly as defined in claim 4, wherein the at least one spring has opposite ends abuttingly engaged to the two protrusions of the switch member and an interior side of the base respectively so as to locate the switch member at the first position or at the second position.

7. The wheel assembly as defined in claim 1, wherein the wheel has two of the stop portions, each having recesses and outer protrusions arranged in a circular pattern on opposite sides of the wheel, and the brake device has a top plate and two lateral plate projected downwards from opposite ends of the top plate, wherein the top plate is connected to the bottom end of the driven shaft, and the lateral plates are located at outer sides of the stop portions respectively, each of which has a stop block to form the stop portion, such that when the switch member is moved to the first position, the driven shaft is moved upwards to move the stop blocks of the lateral plates of the brake member into one of the recesses of the wheel.

8. The wheel assembly as defined in claim 7, wherein top plate has a bore, and the bottom end of the driven shaft is inserted into the bore of the top plate, and an annular block is provided on the bottom end of the driven shaft, and the annular block has a diameter greater than that of the bore of the top plate.

9. A wheel assembly as defined in claim 2, wherein the wheel has two of the stop portions, which are teeth portions on opposite sides of the wheel, and the brake member has two teeth portions to be meshed with the teeth portions of the wheel when the switch member is moved to the first position to drive the second plates and the driven shaft moving downwards.

10. The wheel assembly as defined in claim 9, wherein the brake device has a first bore and a second bore communicated with each other, and the driven shaft, which has a lateral slot adjacent to the bottom end, has the bottom end inserted into the first bore, and the brake device includes a pin to be inserted into the second bore and received in the lateral slot.

11. The wheel assembly as defined in claim 1, further comprising a hub received in the upper bore of the base and the lower bore of the frame, which includes an upper stop protrusion at a top end thereof touching the an interior side of the base and a lower stop protrusion at a bottom end thereof touching an interior side of the frame, such that the frame is pivoted on the base for rotation.

12. The wheel assembly as defined in claim 11, further comprising a bearing, which has a ring plate and a plurality of balls, wherein the ring plate is located between the hub and the frame, which has a central hole to pass the driven shaft therethrough and a plurality of bores around the central hole to receive the balls respectively.

* * * * *